United States Patent [19]

Fabianowski et al.

[11] Patent Number: 5,475,582
[45] Date of Patent: Dec. 12, 1995

[54] STEPLESS CONTROL OF A LOAD GUIDED PARALLEL RESONANT INVERTER

[75] Inventors: Jan Fabianowski, Dortmund; Robert Ibach, Schwerte, both of Germany

[73] Assignee: ABB Patent GmbH, Mannheim, Germany

[21] Appl. No.: 412,602

[22] Filed: Mar. 29, 1995

Related U.S. Application Data

[63] Continuation of Ser. No. 36,826, Mar. 25, 1993, abandoned.

[30] Foreign Application Priority Data

Mar. 25, 1992 [DE] Germany ............................ 42 09 644.8

[51] Int. Cl.[6] .................................................. H02M 7/523
[52] U.S. Cl. ............................................. 363/96; 363/136
[58] Field of Search ............................. 363/96, 98, 136

[56] References Cited

U.S. PATENT DOCUMENTS

| | | | |
|---|---|---|---|
| 4,086,621 | 4/1978 | Vukasovic | 363/136 |
| 4,275,438 | 6/1981 | Stirniman | 363/136 |
| 4,390,769 | 6/1983 | Steigerwald | 219/10.77 |
| 4,426,564 | 1/1984 | Steigerwald et al. | 363/132 |
| 4,581,693 | 4/1986 | Ueda et al. | 363/96 |
| 4,626,978 | 12/1986 | Thouvenin | 363/37 |
| 4,700,281 | 10/1987 | Thorn et al. | 363/96 |
| 5,126,522 | 6/1992 | Katayama et al. | 219/10.77 |

FOREIGN PATENT DOCUMENTS

| | | | |
|---|---|---|---|
| 2212832 | 9/1973 | Germany | H02H 7/122 |
| 2834561 | 2/1980 | Germany | H02M 7/505 |
| 3023697 | 1/1982 | Germany | H02P 13/10 |
| 3414102 | 11/1984 | Germany | H02P 13/18 |
| 3441000 | 3/1990 | Germany | H02M 7/523 |
| 2028018 | 2/1980 | United Kingdom | H02M 1/18 |
| 2091500 | 7/1982 | United Kingdom | H02P 5/42 |
| 2140987 | 12/1984 | United Kingdom | H02M 7/48 |

OTHER PUBLICATIONS

Parallelschwingkreisumrichter für die "induktive Erwärmung" Neupauer et al. Siemens Zeitschrift 45, Dec. 1971, No. 9 pp. 601–606.

*Primary Examiner*—Jeffrey L. Sterrett
*Attorney, Agent, or Firm*—Herbert L. Lerner; Laurence A. Greenberg

[57] ABSTRACT

A method for controlling current converter valves of a load-guided parallel oscillator inverter of an induction furnace includes supplying the inverter from a direct current source having positive and negative poles, and adjusting a current flow from the direct current source across the parallel oscillator by firing two diagonally opposed current converter valves of the inverter at a time. The method of the invention includes firing the two diagonally opposed current converter valves at a time with a delay between them for intermittently producing a short circuit current from the positive pole of the direct current source to the negative pole of the direct current source through two of the current converter valves being directly series-connected.

1 Claim, 2 Drawing Sheets

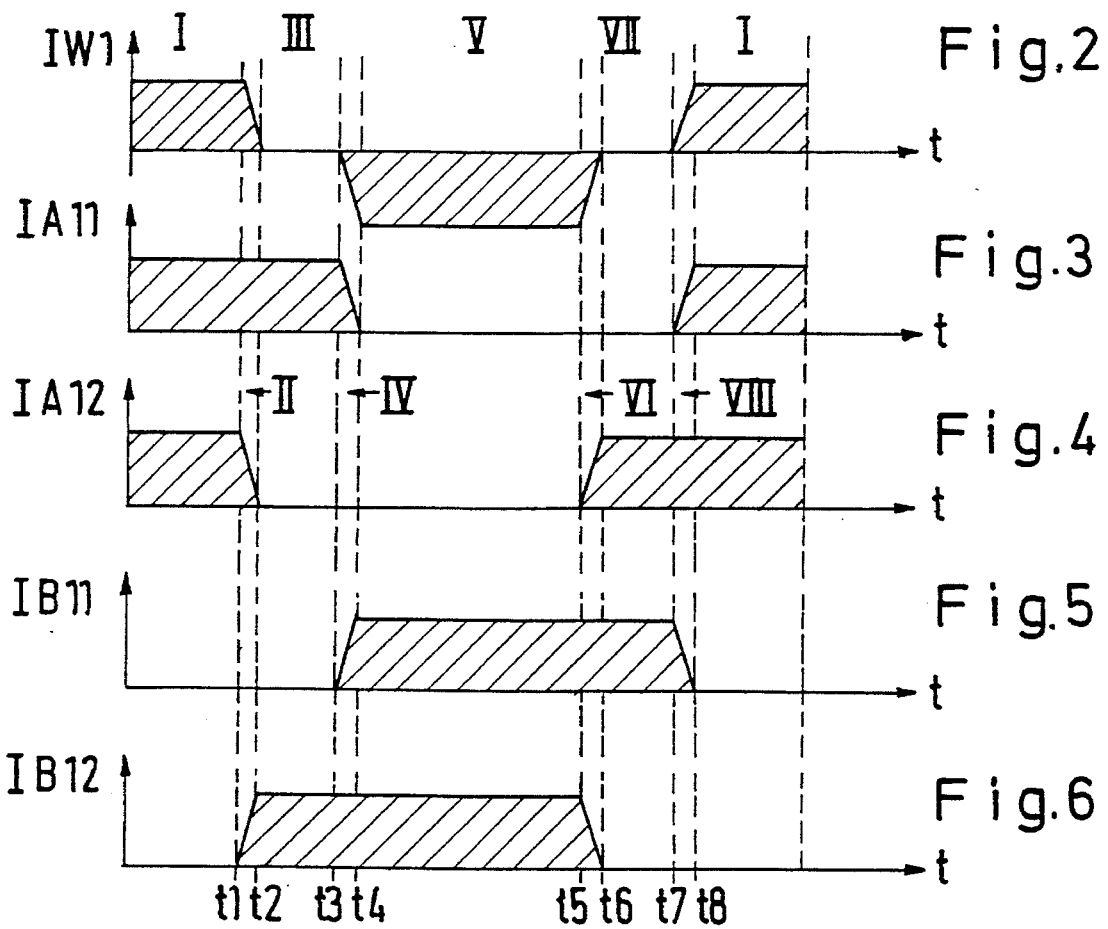
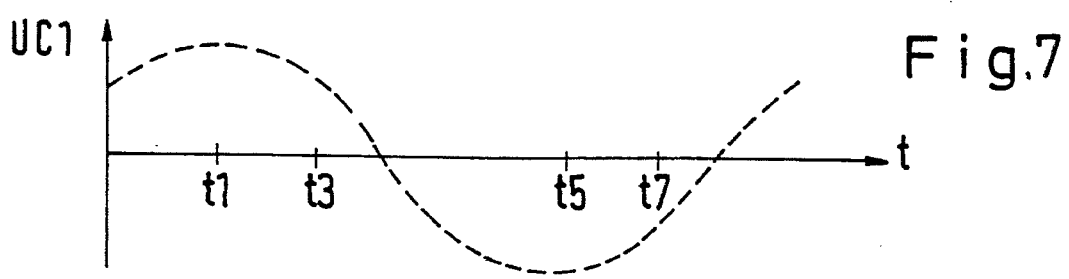

STEPLESS CONTROL OF A LOAD GUIDED PARALLEL RESONANT INVERTER

This application is a continuation-in-part, continuation, of application Ser. No. 08/036,826, filed Mar. 25, 1993 now abandoned.

FIELD OF THE INVENTION

The invention relates to a method for controlling the current converter valve of a load-guided parallel oscillator inverter which is supplied from a direct current source and is part of an induction furnace, wherein a current flow from the direct current source across the parallel oscillator is adjusted by firing two diagonally opposed current converter valves of the inverter at a time.

BACKGROUND AND PRIOR ART

A parallel oscillator converter for inductive heating is known from the publication entitled Siemens-Zeitschrift [Siemens Journal] 45 (1971), No. 9, pp. 601–606. That device is an intermediate circuit converter circuit with an impressed current in the intermediate circuit. The direct current, which is generated by the rectifier on the power supply side from an alternating voltage in the power supply, is converted in the inverter on the load side, into a medium-frequency alternating current. The load includes an inductor, which inductively transmits the nonreactive power to the material to be heated (such as molten metal). If the high reactive power demand is to be met, the inductor must be expanded with the aid of one or more compensation capacitors to make a parallel oscillator. In the load-guided inverter, the impressed intermediate circuit current is alternatingly switched to the load at the rate of the operating frequency, through diagonally opposed valve branches, and produces approximately a sine-wave voltage in the load. Due to the load cycling, the resultant operating frequency is directly dependent on the natural frequency of the load circuit.

It is accordingly an object of the invention to provide a method for controlling the current converter valve of a load-guided parallel oscillator inverter of an induction furnace, which overcomes the hereinafore-mentioned disadvantages of the heretofore-known methods of this general type and which enables an infinitely graduated adjustment or regulation of the power output to the load, or in other words to the induction furnace.

SUMMARY OF THE INVENTION

With the foregoing and other objects in view there is provided, in accordance with the invention, a method for controlling current converter valves of a load-guided parallel oscillator inverter of an induction furnace, which includes supplying the inverter from a direct current source having positive and negative poles, and adjusting a current flow from the direct current source across the parallel oscillator by firing two diagonally opposed current converter valves of the inverter at a time, the improvement which comprises firing the two diagonally opposed current converter valves at a time with a delay between them for intermittently producing a short circuit current from the positive pole of the direct current source to the negative pole of the direct current source through two of the current converter valves being directly series-connected.

The advantages attainable with the invention are in particular that an infinitely graduated regulation of energy for the induction furnace is made possible. The power fed to the induction furnace decreases as the time interval between the firing of the two diagonally opposed current converter valves increases. The power fed in becomes maximal if the two diagonally opposed valves are fired simultaneously without any time interval whatever between them. The power fed in becomes minimal at the longest possible time interval, and peripheral conditions such as sufficiently high voltage at the capacitor of the parallel oscillator and valve recovery times must be taken into consideration.

In accordance with a concomitant mode of the invention, there is provided a method which comprises setting a time interval for firing the valves in a range from 0° to 50°.

Other features which are considered as characteristic for the invention are set forth in the appended claims.

Although the invention is illustrated and described herein as embodied in a method for controlling the current converter valve of a load-guided parallel oscillator inverter of an induction furnace, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

FIGS. 2–6 are graphs showing the course over time of currents flowing in the parallel oscillator and in various current converter valves of the inverter;

FIG. 7 is a graph showing the course over time of a voltage at the capacitor of the parallel oscillator;

DESCRIPTION OF THE PREFERRED EMBODIMENTS

Figure 1:
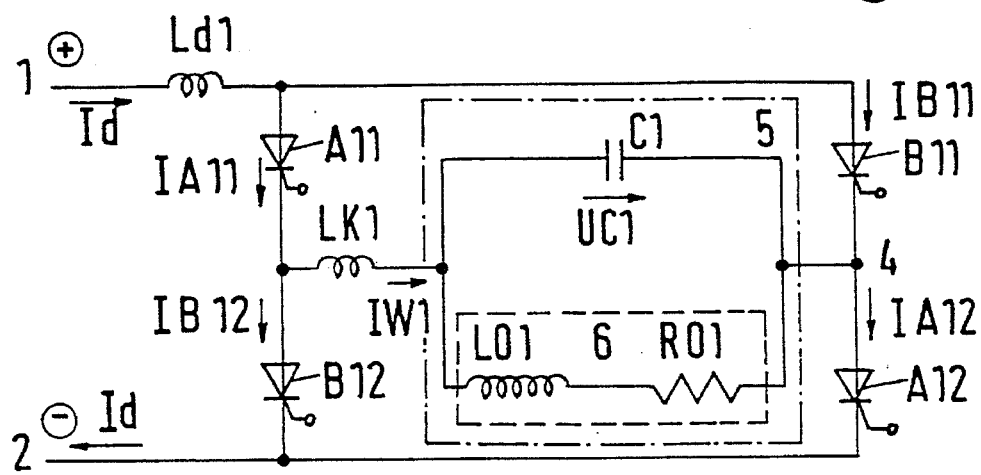
FIG. 1 is a schematic circuit diagram of a parallel oscillator supplied through an inverter of an induction furnace.

Referring now to the figures of the drawing in detail and first, particularly, to FIG. 1 thereof, there is seen a parallel oscillator of an induction furnace, which is supplied through an inverter. An inverter including four current converter valves A11, A12, B11, B12 can be seen. Anodes of the valves A11 and B11 are connected through a smoothing choke Ld1 to a positive pole 1 of a direct current source, and cathodes of the valves B12 and A12 are connected to a negative pole 2. The positive pole 1 and the negative pole 2 are supplied, by way of example, through a rectifier from a three-phase power supply. A connection point of the cathode of the valve A11 and the anode of the valve B12 forms a first load terminal 3, and a connection point of the cathode of the valve B11 and the anode of the valve A12 forms a second load terminal 4 of the inverter.

A parallel oscillator 5 is connected between the two load terminals 3, 4, and a commutating inductive reactor LK1 is disposed between the load terminal 3 and the parallel oscillator 5. The parallel oscillator 5 includes a coil 6 of an induction furnace and a parallel-connected capacitor C1. The coil 6 has an inductive resistor LO1 and an ohmic resistor RO1.

The input current of the inverter, that is the current supplied by the direct current source and flowing through the smoothing choke Ld1, is indicated by reference symbol Id. The flows of current through the valves A11, A12, B11 and B12 are indicated by reference symbols IA11, IA12, IB11, and IB12. The output current of the inverter, that is the flow of current through the commutating reactor LK1 and the parallel oscillator 5, is indicated by reference symbol IW1. The voltage at the capacitor C1 is indicated by reference symbol UC1.

In FIGS. 2–6, the course of the currents flowing in the parallel oscillator and in the various current converter valves of the inverter is shown. Specifically, FIG. 2 shows the current IW1, FIG. 3 the current IA11, FIG. 4 the current IA12, FIG. 5, the current IB11, and FIG. 6 the current IB12. In order to provide a fundamental explanation of the flows of current, eight different switching phases can be distinguished, specifically a phase I up to a time t1, during which a positive flow of current IW1 occurs; a commutation phase II between the times t1 and t2; a phase III between the times t2 and t3, during which no current IW1 flows; a commutation phase IV between the times t3 and t4; a phase V between the times t4 and t5 during which a negative current flow IW1 occurs; a commutation phase VI between the times t5 and t6; a phase VII between the t6 and t7 during which no current IW1 flows; and a commutation phase VIII between the t7 and t8. The flows of current in the further period of time after the time t8 correspond to phase I again, so that phase I includes the period of time between the times t8 and t1.

As can be seen from the courses of current over time in FIGS. 2–6, during phase I the valves A11 and A12 are conducting, and there is a flow of current from the positive pole 1 to the negative pole 2 through the valve A11, the parallel oscillator 5, and the valve A12. In other words, Id=IA11=IW1=IA12. At the time t1, the valve B12 is fired. This produces a commutation current through the capacitor C1 and the valves B12 and A12, and the current across the parallel oscillator 5 and the valve A12 commutates to the valve B12 during this phase II, so that IW1 and IA12 vanish, while IB12 rises. During phase III, there is a flow of current from the positive pole 1 to the negative pole 2 through the valve A11 and the valve B12. In other words, Id=IA11= IB12.

At the time t3, the valve B11 is fired, and during the commutation phase IV, a commutation current is produced across the capacitor C1, the valve A11 and the valve B11. In other words, the current IA11 disappears, and the currents IB11 and IW1 rise (IW1 rises to the negative value). During the ensuing phase V, Id=IB11=IW1=IB12. In other words, the current flows from the positive pole 1 to the negative pole 2 through the valve B11, the parallel oscillator 5 and the valve B12.

At the time t5, the valve A12 is fired. This produces a commutation current across the capacitor C1 and the valves A12 and B12, and during this commutation phase VI, the current across the parallel oscillator 5 and the valve B12 is commutated to the valve A12, so that IW1 and IB12 disappear while A12 rises. During the ensuing phase VII, a flow of current is produced from the positive pole 1 to the negative pole 2 through valve B11 and the valve A12. In other words, Id=IB11=IA12.

At the time t7, the valve A11 is fired, and during the commutation phase VIII, a commutation current is produced across the capacitor C1, the valve B11 and the valve A11. In other words, the current IB11 disappears and the currents IA11 and IW1 rise (IW1 rises to the positive value). During the ensuing phase I, the flow of current is again from the positive pole 1 to the negative pole 2 through the valve A11, the parallel oscillator 5 and the valve A12, as already described above. In FIG. 7, the course over time of the voltage at the capacitor C1 of the parallel oscillator is shown. The frequency of this voltage UC1 is dependent on the capacitance of the capacitor C1 and on the resistance and on the inductive resistor LO1 of the coil 6. Triggering of the valves of the inverter is effected while taking into account this frequency and the zero crossovers of the voltage and the positive and negative maximums of the capacitor voltage UC1. An especially important factor is that the voltage UC1 at the times t1 (firing of B12) and t3 (firing of B11) is sufficiently positive, because the capacitor C1 must furnish the necessary commutation voltage in order to drive the commutation current across the valves B12 and A12, or the valves A11 and B11. It is also important that the voltage UC1 be sufficiently negative at the times t5 (firing of A12) and t7 (firing of A11), because the capacitor C1 must furnish the requisite commutation voltage to drive the commutation current across the valves A12 and B12, or B11 and A11, respectively. The applicable commutation in any case must be terminated before the zero crossover of the voltage UC1. Care must also be taken to adhere to the necessary recovery time once commutation has occurred until the reversal of the voltage at the current converter valve that has just blocked.

From the above explanation, it can be seen that power from the direct current source is supplied to the parallel oscillator 5 and therefore to the coil 6 of the induction furnace only during phases I, II, IV, V, VI, and VIII, but not during phases III and VII. By suitably lengthening or shortening these phases III and VII, the power supplied to the induction furnace can thus be adjusted and therefore regulated.

Figure 8:
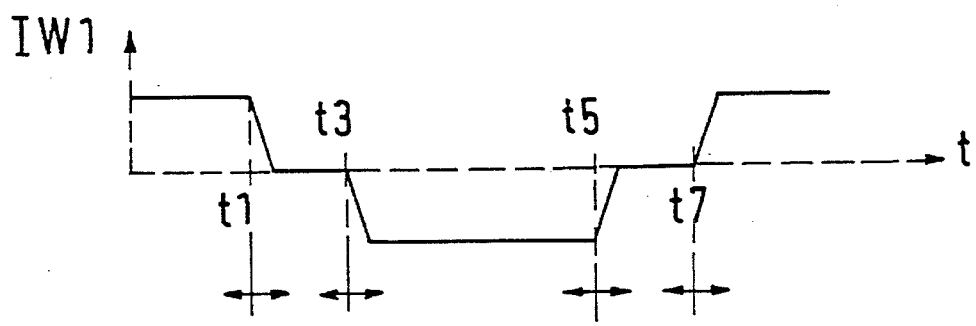
FIG. 8 is a graph showing the fundamental possibilities of varying a firing time of the current converter valves of the inverter for power regulation.

The beginning and end of phase III are fixed by firing the valves B12 at time t1 and B11 at time t3, respectively, and the beginning and end of phase VII are fixed by firing the valves A12 at time t5 and A11 at time t7, respectively. It is selectively possibly to vary either only the times t1 and t5, or only the times t3 and t7, or all of the times t1, t3, t5 and t7 in order to regulate the power, while the conditions already mentioned above for the voltage UC1 must be met. In other words, at time t3, the voltage UC1 must still be sufficiently positive, and at time t7 it must still be sufficiently negative to drive the requisite commutation currents. In FIG. 8, these fundamental options in varying the firing time of the current converter valves of the inverter for power regulation are shown.

Figure 9:
FIGS. 9–11 are graphs showing the splitting of the constant input current of the inverter into a flow of current through the parallel oscillator and a "short circuit".
Figure 10:
Figure 11:
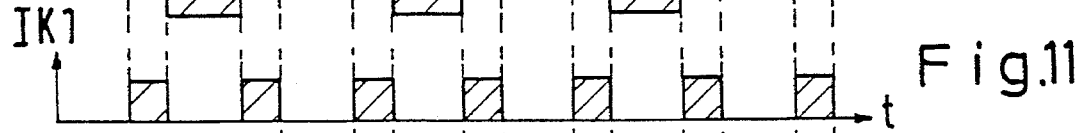

An alternative controlling method is obtained if the valve B11 is fired at time t1 and the valve B12 at time t3. It is also possible to fire the valve A11 alternatively at time t5 and the valve A12 at time t7. In this alternative method, although different current courses IA11, IA12, IB11, IB12 are produced than those described for FIGS. 3–6, nevertheless the current course of IW1 remains unchanged. In FIGS. 9, 10 and 11, the splitting of the constant input current Id of the inverter into a current flow IW1 through the parallel oscillator 5 and a short circuit current IK1 is shown schematically, ignoring the commutation phases in each case. While the flow of current IW1 is through the diagonally opposed valves A11, A12 or B11, B12, the short circuit current IK1 flows from the positive pole 1 of the direct current source to the negative pole 2 through two directly series-connected valves A11, B12 or B11, A12. In the example of FIGS. 9, 10 and 11, the short circuit current blocks are approximately half as wide as the current blocks across the parallel oscillator. A very wide power control range (1:100 and more) is possible, which corresponds to a time interval of up to approximately 50° (electrical or phase angle degrees).

We claim:

1. A method for controlling current converter valves of a load-guided parallel oscillator inverter of an induction furnace, which comprises supplying the inverter from a direct current source having positive and negative poles wherein said inverter feeds a parallel-resonant circuit composed of an inductive resistor of an induction furnace and a capacitor in parallel connection with the inductive resistor, adjusting a current flow from the direct current source across the parallel oscillator by firing two diagonally opposed current converter valves of the inverter at a time, the two diagonally opposed current converter valves being fired at a time with a delay between them for intermittently producing a short circuit current from the positive pole of the direct current source to the negative pole of the direct current source through two of the current converter valves being directly series-connected; wherein the firing of the converter valves is performed in response to the voltage zero crossings following the respective positive and negative maxima of the voltage across the capacitor and their frequency, the frequency being a function of the capacitance of the capacitor, the resistance, and the inductivity of the inductive resistor; and setting a time interval for firing the valves in a range from 0° to 50°.

* * * * *